Feb. 7, 1961  L. E. GOFF, JR  2,971,131
PROTECTIVE RELAYING SYSTEM FOR AN ELECTRIC
POWER TRANSMISSION CIRCUIT
Filed Dec. 19, 1956

Inventor:
Leon E. Goff, Jr.,
by J Wesley Haubner
His Attorney.

United States Patent Office 2,971,131
Patented Feb. 7, 1961

2,971,131

PROTECTIVE RELAYING SYSTEM FOR AN ELECTRIC POWER TRANSMISSION CIRCUIT

Leon E. Goff, Jr., Drexel Hill, Pa., assignor to General Electric Company, a corporation of New York Filed Dec. 19, 1956, Ser. No. 629,351

8 Claims. (Cl. 317—36)

This invention relates to relaying systems for protecting electric power transmisison circuits, and more particularly to an improved system utilizing distance and overcurrent relays for protecting an electric power "subtransmission" line.

The relatively short, lower voltage (e.g., 33,000 volts or less phase-to-phase) circuits of an electric power transmisison system are commonly referred to as "subtransmission" lines. Subtransmission lines generally have been protected against fault or short circuit conditions by means of overcurrent or directional-overcurrent relaying systems. More adequate but relatively complex and expensive distance or pilot relaying schemes, such as those employed on higher voltage transmission lines, usually are not considered economically justified for subtransmission line protection.

Any successful relaying system for a subtransmission line section connecting a transmisison system to distribution circuits and utilization apparatus should be capable of selectively performing two functions. Upon the occurrence of a fault condition on the protected section of the subtransmission line, the relaying system should respond as rapidly as possible to isolate the faulted section from the source of power generation, and toward this end instantaneous-overcurrent relays are commonly used. In addition, the relaying system should realize a delayed response to a fault condition occurring on any utilization element or adjoining subtransmission line, thereby providing for the abnormal situation wherein the associated individual protective means, which is intended to provide primary protection for the faulted element, fails within an appropriate time to remove the element from service. The latter slower, supplementary operation provides what is known as secondary or back-up protection. To obtain proper selectivity with the primary protective means of the utilization apparatus, back-up operation should be postponed until after the primary protective means has had adequate time to function normally. Accordingly, the instantaneous-overcurrent relays commonly used for high-speed response to faults occurring on the protected section of the subtransmission line must not be allowed to operate in response to less than the maximum possible short circuit current that would flow if a fault were located at the utilization end of the protected section. But fault current magnitude depends upon the amount of power generation, and the amount of line section protected by the instantaneous-overcurrent relays will be lessened during periods of reduced connected generation capacity. Where the possible variation between maximum and minimum generation conditions is great, the instantaneous relays may be completely unresponsive to any section fault occurring during minimum generation, and thus the desirable high-speed relaying operation would not be obtained.

In a copending patent application S.N. 563,641, now Patent No. 2,902,625, filed for Clyde G. Dewey on February 6, 1956, and assigned to the present assignee, there is described and claimed a simple, low-cost selective relaying system employing distance type relays for protecting a section of subtransmission line substantially independently of fault current magnitude. Briefly, this relaying system comprises a directional discriminating relay having a distance operating characteristic and including switching means for changing its operating range from an initial amount to an extended amount, and a time-overcurrent relay connected to actuate the switching means after a time delay inversely related to fault current magnitude. The directional discriminating distance relay will operate to perform a predetermined protective function substantially instantaneously in response to a subtransmission line fault located within the initial operating range of said relay, the initial operating range being esesntially independent of fault current magnitude. On the other hand, an ore remotely located fault within the extended operating range of the distance relay will cause this relay to operate only after operation by the time-overcurrent relay, whereby back-up protection is provided.

The timing of the back-up function performed by the above described relaying system is controlled by the time-overcurrent relay. This relay is adjusted to provide sufficient time delay for proper selectivity in accordance with the principles discussed hereinbefore. However, in the system referred to there is some possibility that the back-up relaying may take effect too soon under some abnormal conditions involving certain dual faults which occur simultaneously or in rapid sequence. This is because the time-overcurrent relay is not directionally discriminating and may start timing for a fault that is located without the opertaing range of the distance relay. If a second fault should occur within the extended operating range of the distance relay before the time-overcurrent relay has had opportunity to reset fully, the subsequent relay operation may take place too quickly for proper selectivity under the circumstances.

Accordingly, it is an object of this invention to provide for subtransmission line protection an improved relaying system employing distance and overcurrent relays arranged to ensure proper timing of the back-up function under all possible fault conditions.

In many prior art protective relay schemes using distance relays, false instantaneous relaying operation may possibly be caused by the accidental failure of the potential which normally energizes a restraining winding of the distance relay. Therefore, another object of this invention is the provision of an improved subtransmission line relaying system employing distance and overcurrent relays arranged to prevent false instantaneous relaying operation in the event of a failure of potential supplied to the distance relay.

In carrying out my invention in one form, I provide for a subtransmission circuit a distance relay of the inherently directional discriminating mho type having an initial operating range which encompasses a predetermined portion of the protected circuit. I also provide a current responsive fault detector and a normally inactive time-overcurrent unit. The fault detector operates in response to a circuit fault to extend, after a slight time delay, the operating range of the relay. Whenever the relay operates before its operating range is extended, it performs a predetermined circuit controlling function, such as tripping a circuit interrupter, but relay operation after its operating range has been extended is utilized to activate the time-overcurrent unit. The time-overcurrent unit will then respond with a delay that is inversely related to circuit current to perform the same predetermined circuit controlling function. Thus, the circuit interrupter is tripped immediately upon the occurrence of a fault on the predetermined portion of the protected circuit, while a more remote fault will cause tripping only after a time delay accurately determined by the time-overcurrent unit the time delay being unaffected by the occurrence of any prior fault located beyond the extended operating range of the relay.

My invention will be better understood and further objects and advantages will be apparent from the following description taken in conjunction with the accompanying drawing in which.

Figure 1:
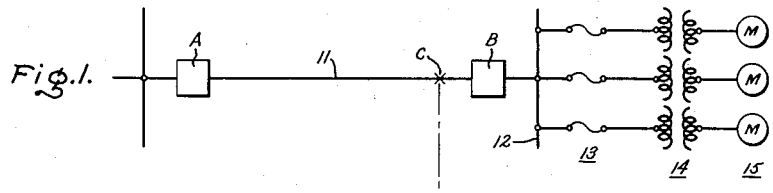
Fig. 1 is a single line diagram of a subtransmission circuit.

As shown in the single line diagram of Fig. 1, a section 11 of an electric power subtransmission line extends between opposite ends or terminals A and B. Terminal A is connected to an electric power system, not shown, which includes a source or sources of power generation. Terminal B is connected to a distribution circuit 12 which supplies utilization apparatus such as the illustrated power fuses 13, transformers 14, and motors 15. The subtransmission line section 11 transmits 3-phase alternating current of power frequency, such as 60 cycles per second, from terminal A to terminal B at relatively low voltage, i.e., 33,000 volts or less phase-to-phase.

A protective relaying system is provided at terminal A to perform quickly a circuit controlling function, such as opening a circuit interrupter, upon the occurrence of a phase fault, i.e., upon the occurrence of a short circuit between phase conductors, at some point on the associated subtransmission line section 11. The same relaying system is arranged selectively to coordinate with the power fuses 13 or other protective means, whereby the same circuit controlling function is performed in delayed response to a similar fault occurring on any one of the connected motor feeders or associated distribution circuits.

Figure 2:
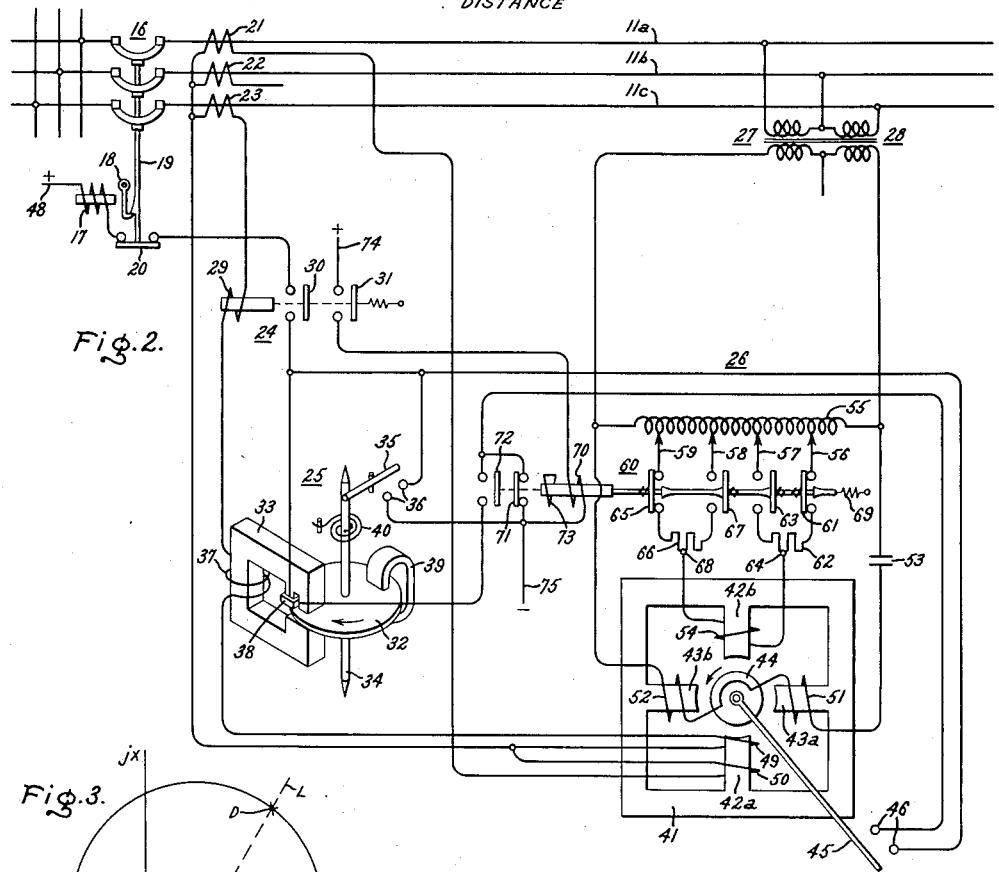
Fig. 2 is a schematic representation of a preferred embodiment of my protective relaying system as it is utilized at one terminal of the subtransmission circuit shown in Fig. 1.

Fig. 2 illustrates the protective relaying system at terminal A. The phase conductors comprising the protected subtransmission line 11 are designated 11a, 11b and 11c. A 3-pole circuit interrupter 16 shown in its circuit making position and having an electroresponsive trip coil 17 is provided. Energization of trip coil 17 magnetically attracts a pivotally mounted latch 18 which releases a movable switch member 19 for rapid circuit interrupting action. Upon opening of circuit interrupter 16, an auxiliary switch 20 operates to deenergize the trip coil 17.

Three Y-connected current transformers 21, 22 and 23 are coupled to conductors 11a, 11b and 11c, respectively, at terminal A. The secondary circuit of transformer 23, as can be seen in Fig. 2, supplies an instantaneous-overcurrent unit 24, a time-overcurrent unit 25, and a fault responsive unit 26. The fault responsive unit 26 is also supplied with current from transformer 21 and with voltage taken from conductors 11a and 11c by means of a pair of potential transformers 27 and 28. The three relaying units 24, 25 and 26 provide subtransmission line protection with respect to phase faults involving conductors 11a and 11c. Although omitted from the drawing for the sake of simplicity, it will, of course, be understood that similar groups of relaying units would be furnished in a commercial polyphase system for each of the remaining pairs of conductors 11a—11b and 11b—11c and that such units would be connected in a manner similar to that of the group of units illustrated. In this manner 3-phase protection of the electric power circuit would be obtained. In any event, the circuitry and operation of my improved protective relaying system may be aptly described and readily understood with reference to only those units shown.

The instantaneous-overcurrent unit 24, as is illustrated in Fig. 2, preferably comprises an electromagnetic relay having an operating coil 29 energized in response to current flowing in conductor 11c. A pair of normally open contacts 30 and 31 are actuated by coil 29. Unit 24 is arranged to operate substantially instantaneously when energized in response to greater than a predetermined level of current in phase conductor 11c, the predetermined level being selected to be greater than fullload or normal current but less than the minimum possible fault current resulting from a phase fault located on the protected electric power circuit. Thus unit 24 performs a fault detecting function, and it will be referred to hereinafter as a fault detector.

The time-overcurrent unit 25 shown in Fig. 2 is arranged to be normally inactive, and when activated it operates with a time delay that will vary inversely as a function of line current magnitude. Although other suitable timing units may be used, the particular unit which I have chosen to illustrate by way of example comprises a rotatable induction disk 32 and a shaded-pole actuating electromagnet 33. Disk 32 is carried on a transverse shaft 34 which is rotatably supported by means of suitable upper and lower bearings not shown. Shaft 34 also carries a switch arm 35 which is disposed in cooperating relationship with a pair of stationary switch contacts 36. When activated, the time-overcurrent unit operates by rotating induction disk 32 in a clockwise direction, as viewed in the drawing, thereby moving switch arm 35 into engagement with contacts 36. Contacts 36—in series circuit relationship with the normally open contact 30 of fault detector 24, the auxiliary switch 20 and the trip coil 17 of circuit interrupter 16—are connected to a suitable source of direct voltage represented by positive and negative supply buses 48 and 75, respectively. Thus, operation of unit 25 while the fault detector contact 30 is closed energizes trip coil 17 to open the circuit interrupter 16.

The actuating electromagnet 33 of unit 25 is provided with an operating winding 37 that is energized in accordance with the current flowing in conductor 11c. The magnitude of magnetic flux in the electromagnet is determined by the ampere-turns of winding 37. The pole faces of electromagnet 33 are disposed on opposite sides of the induction disk 32, and the opposing poles are arranged to provide two parallel paths for the magnetic flux in the electromagnet. One of the paths is encircled by at least one shading winding 38, while the other path is unshaded. The shading winding 38 is linked by a portion of the magnetic flux produced by alternating current in operating winding 37, and in accordance with Faraday's law, alternating voltage is induced in this winding.

As long as the shading winding 38 is effectively open circuited, no current can flow and the magnetic flux encompassed thereby is unaffected. While in this condition the time-overcurrent unit 25 remains inactive. But as soon as shading winding 38 is shunted by a current conducting circuit, a complete circuit is established and the induced voltage in the shading winding causes current to circulate therein, the magnitude of current being limited by the resistance of the winding itself and the impedance of the external circuit connected thereto. As is well known to those skilled in the art, this current in the shading winding and the flux produced thereby effectively retard the magnetic flux in the shaded path of the opposing poles with respect to the flux in the unshaded path. The magnetic flux produced by the operating winding 37 is now divided into two out-of-phase components, and the interaction of these two out-of-phase flux components produces driving or operating torque in induction disk 32. Thus, disk 32 will start rotating to carry the movable switch arm 35 into engagement with the stationary switch contacts 36. The magnitude of operating torque is proportional to the square of the ampere-turns of winding 37. A suitable permanent magnet 39 is used to provide retarding or damping action whenever disk 32 is rotating.

A spiral spring 40 having opposite ends fixed to a stationary support and to the shaft 34 respectively provides restraining force opposing clockwise movement by disk 32 and biasing the disk to a reset position wherein switch arm 35 is disengaged from contacts 36 as shown in Fig. 2. By appropriately selecting the number of turns of winding 37, operating torque will be sufficient to overcome restraining force whenever winding 37 is energized by current in excess of a quantity which corresponds to the aforesaid predetermined level of line current in phase conductor 11c required to operate the fault detector 24.

For any given magnitude of line current greater than the aforesaid predetermined level, the time required after induction disk 32 starts rotating until the switch arm 35 engages contacts 36 is determined by the initial position of switch arm 35 with respect to the contacts 36. Suitable means, not shown, may be utilized to adjust this initial position as desired. For any given initial setting of switch arm 35, the operating time of unit 25 depends upon the magnitude of line current which determines the magnitude of operating torque. As the current increases, the operating time becomes shorter. Thus, the time delay of the time-overcurrent unit is inversely related to the amount of line current flowing in conductor 11c.

The fault responsive unit 26 shown in Fig. 2 comprises two components: a conventional distance relay of the mho type; and means for changing the operating range or reach of the mho relay. The unit is connected to respond to phase faults occurring within its operating range and involving phase conductors 11a and 11c.

The structure of the mho relay component of unit 26, as is illustrated schematically in Fig. 2 by way of example, comprises a magnetic frame member 41 having two pairs of oppositely disposed spaced apart poles 42a and 42b and 43a and 43b. An induction cylinder 44 is mounted for rotary movement on its axis which is disposed perpendicular to and intermediate the poles. Suitable windings are located on each pole, and the fluxes produced by currents flowing in these windings induce eddy currents in the induction cylinder 44. The eddy currents interact with the fluxes in a manner to create torques which tend to rotate cylinder 44. A switch arm 45 carried on the axis of cylinder 44 is disposed in cooperating relationship with a pair of stationary switch contacts 46. The mho relay operates to rotate induction cylinder 44 in a counterclockwise direction, as viewed in the drawing, thereby moving switch arm 45 into engagement with contacts 46.

The electrical connections of the mho relay windings will now be considered. Two windings 49 and 50 are located on pole 42a and are supplied with current from the secondary circuits of current transformers 23 and 21 respectively. Operating flux is produced by the net ampere-turns of windings 49 and 50, and the value of this flux is proportional to transmission line current which will be designated by the letter I.

A pair of series connected windings 51 and 52 are disposed on poles 43a and 43b respectively, and these windings are supplied with potential transformer voltage representing the transmission line voltage between phase conductors 11a and 11c. Windings 51 and 52 produce polarizing flux proportional to transmission line voltage which will be designated by the letter E. A capacitor 53 is connected in series with windings 51 and 52 to provide memory action and to produce a phase displacement between the voltage applied across windings 51 and 52 and the line voltage. Capacitor 53 together with windings 51 and 52 form a circuit having a natural frequency which is nearly equal to the system frequency, whereby a voltage supply to these windings is maintained for a few cycles if the voltage of potential transformer 27 and 28 should go to zero as during a transmission line fault located at terminal A. Consequently, the relay will respond correctly to such a fault.

A winding 54 on pole 42b is also coupled to the potential transformers 27 and 28, and this winding is used to produce restraining flux. However, only a predetermined portion of the potential transformer voltage is supplied to winding 54. The predetermined portion is determined by suitable control means which may comprise, for example, the illustrated autotransformer 55, having four adjustable taps 56, 57, 58 and 59, together with a suitable switching device 60. The switching device 60 provides means for changing the connections between the autotransformer taps and winding 54 of the mho relay.

As can be seen in Fig. 2, autotransformer 55 is connected to potential transformers 27 and 28, whereby the voltage across the autotransformer windings represents the transformer line voltage E. The outer taps 56 and 59 of the autotransformer are connected through normally closed main contacts 61 and 65 of device 60 to one terminal of center-tapped resistors 62 and 66 respectively. The inner taps 57 and 58 are connected by means of normally open main contacts 63 and 67 of device 60 to the other terminal of the center-tapped resistors 62 and 66 respectively. Winding 54 is connected between the center taps 64 and 68 of resistors 62 and 66 respectively.

The switching device 60 may be of any suitable type, and for the sake of illustration, I have shown in Fig. 2 a device comprising an electromagnetic attraction switch having a tension spring 69 for biasing the switch to its normal position, an operating coil 70 for actuating the switch to an operated position when energized, a normally closed auxiliary contact 71, and a normally open auxiliary contact 72. Switching device 60 preferably should respond to energization of coil 70 with a relatively short time delay, such as three to ten cycles on a 60 cycles per second basis. Such time delay may be obtained by means of the illustrated shorted turn 73 disposed adjacent coil 70, or by any other suitable means. For example, a capacitor could be connected in circuit with operating coil 70, or two sequentially operable switching devices might be employed instead of one. Energization of coil 70 is controlled by the normally open contact 31 of the fault detector 24, contact 31 connecting coil 70 to a suitable source of direct voltage represented by positive and negative supply buses 74 and 75, respectively.

To assure that voltage is supplied continuously to winding 54 of the mho relay during operation of switching device 60, thereby avoiding interruptions in restraining flux, the normally closed contacts 61 and 65 and the normally open contacts 63 and 67 are arranged to overlap. In other words, as the switch moves from its normal to its operated positions, contacts 63 and 67 close before contacts 61 and 65 open, and on the other hand, as the switch returns to its normal position after operating coil 70 has been deenergized, contacts 61 and 65 close before contacts 63 and 67 can open. The resistors 62 and 66 are provided expressly to prevent short circuiting portions of the autotransformer windings during the periods of contact overlap.

One terminal of the switch contacts 46 of the mho relay is connected to the negative supply bus 75 by means of the normally closed auxiliary contact 71 of switching device 60. The other terminal of contacts 46, in series with the normally open contact 30 of fault detector 24, is connected to the auxiliary switch 20 and the trip coil 17 of circuit interrupter 16 and thence to the positive supply bus 48. Thus a tripping signal is supplied to trip coil 17 and circuit interrupter 16 will open whenever the mho relay contacts 46 are closed while the fault detector 24 is operably energized and switching device 60 is in its normal position.

The switch contacts 46 of the mho relay also are connected in series with the normally open contact 72 of switching device 60 across shading winding 38 of the time-overcurrent unit 25. Thus, closure of mho relay contacts 46 while switching device 60 is in its operated position completes the circuit of winding 38 and provides in effect a starting signal which activates unit 25, whereby unit 25 is able to operate in accordance with the principles set forth hereinbefore. As will become apparent hereinafter, it is not essential to the successful operation of my relaying system that activation of unit 25 be deferred until after switching device 60 has been actuated. In lieu of the arrangement shown, the mho relay may be provided with a second pair of switch contacts connected to shunt shading winding 38 directly whenever the mho relay operates, without regard to whether switching device 60 is in its normal or operated position.

The operation of the mho relay component of fault responsive unit 26 will now be considered. The restraining flux produced by winding 54 is proportional to the transmission line voltage E. As is apparent in Fig. 2, the proportion is greater with switching device 60 in its normal position than when device 60 is in its operated position. The restraining flux reacts with eddy currents induced in the induction cylinder 44 by the polarizing flux to create a restraining torque which is proportional to the square of the transmission line voltage. Thus, with switching device 60 in its normal position, restraining torque is represented by $$\frac{1}{k}E^2$$

and with the switching device in its operated position, the resulting reduced restraining torque is represented by $$\frac{1}{K}E^2$$

where $k$ and $K$ are predetermined constants, $K$ having a greater magnitude than $k$. The magnitudes of these predetermined proportionality constants are dependent upon the adjustment of the autotransformer taps 56, 57, 58, and 59. Restraining torque tends to rotate cylinder 44 clockwise as viewed in the drawing.

The interaction between operating flux produced by windings 49 and 50 and the eddy currents induced in the induction cylinder by the polarizing flux creates an operating torque which is represented by the formula EI cos $(\phi-\theta)$, where $\phi$ is the phase angle between transmission line current and voltage and $\theta$ is a design constant of the mho relay. For transmission line faults located in a forward direction, i.e., in the direction of terminal B with respect to terminal A, the operating torque tends to rotate induction cylinder 44 in a counterclockwise direction.

Whenever restraining torque becomes less than operating torque, the mho relay operates with substantially zero time delay to close its switch contacts 46. The condition of equality between operating and restraining torque defines the operating characteristic of the mho relay. This condition can be expressed in the conventional manner by the alternative equations $$Z=k \cos (\phi-\theta) \text{ and } Z=K \cos (\phi-\theta)$$

where Z is the apparent impedance of the transmission line as determined by the ratio $E/I$ at the local terminal A. Thus, for a given phase angle $\phi$ and proportionality constant $k$ or $K$, relay operation is obtained whenever the voltage-current ratio is less than the predetermined value of impedance Z defined by the equations set forth above.

Figure 3:
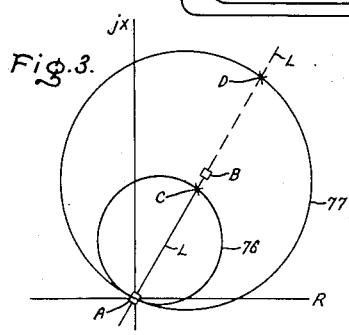
Fig. 3 is a graphical representation, in terms of impedance, of the operating characteristics of the distance type relay shown in Fig. 2.

It is convenient to represent the operating characteristic of a mho relay on the conventional impedance diagram illustrated in Fig. 3. The origin of the impedance diagram represents the point where the potential and current transformers which supply the relay are coupled to the subtransmission circuit, while the abscissa R and the ordinate $jX$ describe values of resistance and inductive reactance respectively as determined by the vectorial relationship between transmission line voltage and current measured by these transformers. Both coordinates R and $jX$ are scaled equally and in the same units, such as ohms, on a phase-to-neutral basis. A subtransmission line has a determinable impedance which is represented, for example, by a portion of a line L. The local terminal A and remote terminal B are indicated on line L.

The circle identified in Fig. 3 by the reference numeral 76 represents the loci of apparent impedance values which define the initial operating range $k \cos (\phi-\theta)$ of the mho relay. This initial operating range is obtained with the switching device 60 in its normal position. Autotransformer taps 56 and 59 are adjusted and the other design constants of the mho relay are selected whereby circle 76 intersects line L at a predetermined point C which represents the impedance of the subtransmission line at a point located just short of terminal B, as is shown in Fig. 3. The distance from local terminal A to point C, which may be, for example, ninety percent of the total distance between terminals A and B, is the initial reach of the mho relay, and this reach is substantially unaffected by variations in fault current magnitude. The relatively short distance between point C and terminal B is necessary to assure selective operation with regard to the protective relaying system of adjoining subtransmission lines and distribution sections.

It is well known to those skilled in the art that under normal load conditions the apparent impedance of the subtransmission circuit will fall well outside of the initial operating range of the mho relay, while upon the occurrence of any phase fault located on the subtransmission circuit within the initial reach of the relay, the apparent impedance will instantly change to a value which results in substantially instantaneous operation of a mho relay.

The circle identified in Fig. 3 by the reference numeral 77 represents the loci of apparent impedance values which define the increased or extended operating range $K \cos (\phi-\theta)$ of the mho relay. The extended operating range is obtained with the switching device 60 in its operated position. The autotransformer taps 57 and 58 are adjusted whereby circle 77 intersects the projected line L at a predetermined point D, and the distance from local terminal A to point D is the extended reach of the mho relay. The extended reach is greater than the initial reach because the effect of actuating switching device 60 from its normal position to its operated position is to weaken the restraining torque for any given value of transmission line voltage E, and consequently the mho relay will operate in response to less operating torque such as produced by the lower fault current resulting from a more distant fault. The area between circles 76 and 77 is known as the backup region and comprises the impedance values at points on the distribution circuit 12 protected by the relaying system at terminal A. The operating range of the mho relay is changed by means of the fault detector 24 operating in conjunction with the control means which comprises autotransformer 55 and switching device 60.

From the foregoing detailed description of the components and circuitry of my relaying system, its mode of operation may now be readily followed. Assume first that phase conductors 11a and 11c are short circuited at some point within the initial reach of the mho relay component of fault responsive unit 26. The accompanying overcurrent condition in conductor 11c will cause immediate operation by the fault detector 24 which closes its normally open contacts 30 and 31. The mho relay also operates instantly to close its contacts 46. Although the operating coil 70 of switching device 60 is energized upon closure of fault detector contact 31, operation of this device will be delayed for at least three cycles, and the normally closed auxiliary contact 71 remains closed momentarily. As a result, a closed circuit is established to connect trip coil 17 between the positive supply bus 48 and the negative supply bus 75, and the circuit interrupter 16 is rapidly opened to isolate the faulted subtransmission line section 11 from the source of generation.

At this point it should be pointed out that the purpose of connecting contact 30 of the fault detector 24 in the trip circuit of circuit interrupter 16 is to prevent a possible false tripping operation in the event that potential supplying the restraining winding 54 of the mho relay should be accidentally lost. If due to some abnormal condition the potential circuits of the mho relay were opened, switch contacts 46 would close even though no fault has occurred. But trip coil 17 can not be energized until the fault detector is operably energized to close its contact 30, thus indicating that a fault condition is actually present.

Assume secondly that a similar phase fault occurs on a utilization feeder within the extended reach of the mho relay. Again the fault detector responds instantly to close contacts 30 and 31, but since the fault is beyond the initial or normal reach of the mho relay, contacts 46 cannot be closed immediately. Closure of contact 31 initiates actuation of the switching device 60 which, after a few cycles time delay is actuated from its normal to its operated position. A smaller portion of transmission line voltage E is now supplied through auto-transformer 55 to winding 54, and the torque restraining mho relay operation is weakened, thereby in effect increasing the ohmic reach of the relay and increasing its operating range. The amount of current required in windings 49 and 50 to produce sufficient operating torque to cause relay operation is now less than initially, and the relay operates instantly to move switch arm 45 into engagement with contacts 46. This closure of switch contacts 46 cannot energize the trip coil 17 of circuit interrupter 16, because auxiliary contact 71 of the switching device 60 is now open. But closure of contacts 46, in conjunction with the closed auxiliary contact 72 of switching device 60, will shunt the shading winding 38 of the time-overcurrent unit 25, thereby activating this unit for delayed operation in response to the fault current flowing in conductor 11c. Induction disk 32 rotates for a time inversely related to the amount of fault current until switch arm 35 engages the switch contacts 36 thereby establishing a closed circuit connecting trip coil 17 for energization by the positive and negative supply buses 48 and 75. The resulting delayed operation of the relaying system at terminal A allows time for the appropriate power fuse 13 or the like to operate, thereby isolating the faulted utilization feeder before the back-up protection provided by the relaying system at terminal A takes effect.

Figure 4:
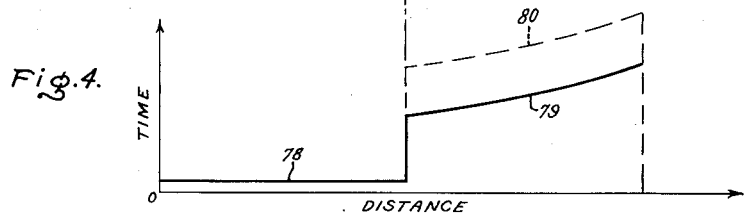
Fig. 4 is a graphical time-distance representation of the operating characteristic of the relaying system shown in Fig. 2.

The overall operating characteristic of the relaying system at terminal A is illustrated graphically in Fig. 4. As indicated by line 78, a phase fault within the initial operating range of the mho relay causes substantially instantaneous operation. Solid line 79 shows that for any phase fault occurring on the distribution circuit or utilization apparatus within the extended operating range of the mho relay, the relaying system at terminal A operates with inverse time delay as determined by the time-overcurrent unit 25. That is, the operating time of the time-overcurrent unit is inversely related to the magnitude of fault current which in turn will be inversely proportional to the distance between the fault and terminal A. It should be readily apparent that the inverse time characteristic of the time-overcurrent unit 25 will coordinate selectively with the similar operating characteristics of time-overcurrent protective means, such as the illustrated power fuses 13, which provide primary protection for the utilization apparatus 15. By maintaining the time-overcurrent unit inactive until a fault occurs within the operating range of the mho relay, I am able to obtain proper timing of the back-up function under all possible conditions of single or plural faults. In other words, a prior fault located behind terminal A and therefore without the reach of the mho relay cannot start time-overcurrent unit operation, and thus the timing unit will not be in a partially operated condition, with a corresponding elapse of a portion of the proper time delay, at the moment a subsequent fault occurs within the relay reach.

The high-speed operation of my relaying system in response to faults within the initial operating range is substantially unaffected by changes in connected generation capacity, but the delayed operation in response to faults in the back-up region is varied by changes in generation. For example, broken line 80 as compared with line 79 represents the delayed operating characteristic of the system during reduced generation conditions. This deviation in time delay is desirable for optimum coordination with the primary protective means whose operating characteristics are similarly affected by changes in generation.

While I have shown and described a preferred form of my invention by way of illustration, many modifications will occur to those skilled in the art. I therefore contemplate by the appended claims to cover all such modifications as fall within the true spirit and scope of my invention.

What I claim as new and desire to secure by Letters Patents of the United States is:

1. In a relaying system for protecting an electric power transmission line having an electroresponsively tripped circuit interrupter at one end thereof, a mho relay having connections for energization by line current and voltage and having predetermined normal and extended operating ranges, means adapted to connect said mho relay to the circuit interrupter for tripping said interrupter substantially instantaneously in response to the occurrence of a line fault within said normal operating range, said mho relay being coupled to current responsive means adapted to be energized in accordance with line current and operable in response to overcurrent conditions accompanying a line fault to change the operating range of said mho relay, normally inactive time-overcurrent means having connections for energization by line current, said time-overcurrent means being arranged for connection to the circuit interrupter for tripping said interrupter when activated after a time delay determined by the magnitude of line current, and means connecting said mho relay to the time-overcurrent means to activate said time-overcurrent means in response to the occurrence of a line fault within said extended operating range, said last-mentioned connecting means being arranged to prevent activation of the time-overcurrent means when the mho relay operates while its operating range is normal.

2. A relaying system for protecting an electric power transmission circuit connected to a source of alternating current by an electroresponsively tripped circuit interrupter comprising, a mho relay having connections for receiving electric quantities representative of circuit current and voltage and operable to provide a tripping signal only in response to a circuit fault located within a predetermined initial reach of said relay, actuating means associated with the mho relay for extending the reach of said relay when energized, a fault detector having connections for receiving an electric quantity representative of circuit current and connected to energize said actuating means in response to a circuit fault, and a normally inactive time-overcurrent unit coupled to said relay, said unit having connections for receiving an electric quantity representative of circuit current and being operable when activated to provide another tripping signal after a time delay inversely related to the magnitude of circuit current, said unit being activated only in response to the mho relay operating after its reach has been extended.

3. In a protective relaying system for an electric power transmission line, normally inactive timing means arranged when activated to perform a predetermined circuit controlling function after a time delay determined by the magnitude of line current, a directional discriminating distance relay having connections for energization in accordance with line current and voltage and having a predetermined initial operating range, control means connected to the distance relay and actuable to change the operating range of said relay, a fault detector adapted to be responsive to a line fault and connected to the control means for initiating actuation thereof, first circuit means connecting the distance relay to said timing means for activating said timing means in response to relay operation, and second circuit means including said distance relay and said control means arranged to perform said predetermined circuit controlling function whenever said relay operates before its range has been changed.

4. In a relaying system for protecting an electric power transmission circuit provided with an electroresponsively tripped circuit interrupter, a directional discriminating relay arranged for connection to the protected circuit and having a distance operating characteristic, said relay having predetermined initial and extended operating ranges, a fault detector arranged for connection to the protected circuit for operating substantially instantaneously in response to a circuit fault, control means connected to both said relay and said fault detector and actuable in delayed response to fault detector operation to change the operating range of said relay, circuit means including said relay, said fault detector and said control means for deriving a tripping signal for the circuit interrupter whenever said fault detector and said relay operate before said change of operating range, another circuit means including said relay and said control means arranged to provide a starting signal upon operation of said relay after said change of operating range, and timing means connected to said other circuit means and operable in response to said starting signal to derive a tripping signal for the circuit interrupter after a variable time delay inversely related to the magnitude of circuit current.

5. A relaying system for protecting an electric power transmission circuit connected to a source of alternating current by an electroresponsively tripped circuit interrupter comprising, a mho relay supplied by circuit current and voltage and operable substantially instantaneously in response to a circuit fault located within a predetermined initial ohmic reach of said relay, a fault detector operable substantially instantaneously in response to a circuit fault, control means connected between the mho relay and said fault detector and operable in delayed response to fault detector operation for extending the ohmic reach of said relay, said relay, fault detector and control means being arranged for connection to the circuit interrupter for initiating tripping of said interrupter whenever said relay and said fault detector both operate before said control means operates, a normally inactive time-overcurrent unit supplied by circuit current and having an inverse-time operating characteristic, and means connected in circuit with the mho relay and said time-overcurrent unit for utilizing operation of said relay to activate said unit, said unit being arranged for connection to the circuit interrupter for initiating tripping of said interrupter in response to the delayed operation of said time-overcurrent unit.

6. In a relaying system for an electric current transmission line, a directional discriminating distance relay energized by line current and provided with windings connected to be energized in accordance with line voltage, timing means coupled to the distance relay and responsive to relay operation to perform a preselected circuit controlling function after a time delay inversely related to the magnitude of line current, control means coupled to the distance relay and actuable with a predetermined time delay to decrease by a predetermined portion the voltage supplied to the voltage windings of said relay, and a fault detector connected to the control means and operable substantially instantaneously in response to a line fault to initiate actuation thereof, said distance relay and said control means being connected and arranged to perform said preselected circuit controlling function whenever said relay operates before said control means has been actuated.

7. In a relaying system for protecting a polyphase electric power circuit including an electro-responsively tripped multipole circuit interrupter, a plurality of directional discriminating fault responsive relay means each being arranged for association with a different phase of the circuit and each having predetermined initial and extended operating ranges, a plurality of current responsive means each being arranged for coupling to a different phase of the circuit and each being connected to a different relay means to change the operating range of the associated relay means in response to a circuit fault involving the associated phase, each of said relay means being adapted to be connected to the circuit interrupter for tripping said interrupter only upon operation before its operating range is changed and each being arranged to provide a starting signal upon operation after its operating range has been changed, and a plurality of timing means adapted to be connected to the circuit interrupter, each of the timing means being arranged for association with a different phase of the circuit and each being connected to a different relay means for response to the starting signal of the associated relay means for tripping said interrupter after a variable time delay inversely related to the magnitude of circuit current in the associated phase.

8. In a relaying system for protecting an electric power transmission line provided with an electroresponsively tripped circuit interrupter, directional discriminating relay means having connections for energization in accordance with line voltage and current and having a distance operating characteristic, said relay means having a predetermined initial operating range and a predetermined extended operating range, means adapted to be connected to the protected line and coupled to the relay means for changing the operating range of said relay means in response to the occurrence of a line fault, first circuit means adapted to connect said relay means to the circuit interrupter for supplying a first tripping signal to said interrupter only in response to relay operation before said change of operating range, timing means operable after a variable time delay inversely related to the magnitude of line current when energized by a starting signal, second circuit means connecting said relay means to the timing means for supplying a starting signal to energize said timing means in response to relay operation after said change of operating range, and third circuit means adapted to connect the timing means to the circuit interrupter for supplying a second tripping signal to said interrupter in response to timing means operation.

References Cited in the file of this patent

UNITED STATES PATENTS

| 1,839,467 | Crichton | Jan. 5, 1932 |
|---|---|---|
| 2,214,866 | Warrington | Sept. 17, 1940 |
| 2,584,765 | Warrington | Feb. 5, 1952 |
| 2,797,369 | Cordray | June 25, 1957 |
| 2,846,620 | Dewey | Aug. 5, 1958 |
| 2,902,625 | Dewey | Sept. 1, 1959 |
| 2,902,626 | Goff | Sept. 1, 1959 |

FOREIGN PATENTS

| 606,544 | Germany | Dec. 5, 1934 |
|---|---|---|
| 581,360 | Great Britain | Oct. 10, 1946 |